(12) United States Patent
Ling

(10) Patent No.: US 9,794,000 B2
(45) Date of Patent: Oct. 17, 2017

(54) HIGH-SPEED, LOW-POWER OPTICAL COMMUNICATIONS

(71) Applicant: Maxlinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

(21) Appl. No.: 15/131,676

(22) Filed: Apr. 18, 2016

(65) Prior Publication Data

US 2016/0308619 A1   Oct. 20, 2016

Related U.S. Application Data

(60) Provisional application No. 62/149,099, filed on Apr. 17, 2015.

(51) Int. Cl.
*H04B 10/00* (2013.01)
*H04B 10/564* (2013.01)
*H04B 10/40* (2013.01)
*H04B 10/079* (2013.01)

(52) U.S. Cl.
CPC ..... *H04B 10/564* (2013.01); *H04B 10/07955* (2013.01); *H04B 10/40* (2013.01)

(58) Field of Classification Search
CPC . H04B 10/564; H04B 10/07955; H04B 10/40
See application file for complete search history.

(56) References Cited

U.S. PATENT DOCUMENTS

| | | | | |
|---|---|---|---|---|
| 5,959,749 A * | 9/1999 | Danagher | ........... | H04J 14/0212 385/24 |
| 6,101,012 A * | 8/2000 | Danagher | ........... | H04J 14/0212 398/1 |
| 6,852,928 B2 * | 2/2005 | Giaretta | ............. | H01S 5/02212 174/547 |
| 6,867,368 B2 * | 3/2005 | Kumar | ................ | H01S 5/02212 174/524 |
| 7,210,859 B2 * | 5/2007 | Kumar | ................ | H01S 5/02212 257/E23.19 |
| 8,090,258 B2 * | 1/2012 | DeLew | ................ | H04B 10/073 398/16 |

(Continued)

*Primary Examiner* — Danny Leung
(74) *Attorney, Agent, or Firm* — McAndrews, Held & Malloy, Ltd.

(57) ABSTRACT

Aspects of a method and system for high-speed, low-power optical communications are provided. In one embodiment, a system for optical communications comprises a digital-to-analog converter (DAC), a driver, and a transmit optical subsystem. The DAC is operable to receive a digital code of a plurality of digital codes and output an analog current signal having an analog current level of a plurality of analog current levels. The driver is operable to condition the analog current signal output from the digital-to-analog converter. The transmit optical subsystem is operable to generate an optical power signal from the conditioned analog current signal. A mapping between the plurality of digital codes and the plurality of analog current levels is dynamically controlled according to one or more characteristics of the optical power signal. The one or more characteristics comprise or a symbol amplitude sensitivity and/or a nonlinearity that may be temperature dependent.

20 Claims, 8 Drawing Sheets

(56) References Cited

U.S. PATENT DOCUMENTS

| | | | | |
|---|---|---|---|---|
| 8,112,001 B2* | 2/2012 | Lowery | H04B 10/2543 | 398/158 |
| 8,249,452 B2* | 8/2012 | Biegert | H04J 14/0282 | 398/58 |
| 8,311,412 B2* | 11/2012 | Rakib | H04L 12/2801 | 370/229 |
| 8,396,369 B1* | 3/2013 | Farmer | H04B 10/25751 | 398/115 |
| 8,457,086 B2* | 6/2013 | Asati | H04L 12/2801 | 370/216 |
| 8,576,101 B1* | 11/2013 | Lin | H03M 1/1042 | 341/118 |
| 8,594,506 B1* | 11/2013 | Farmer | H04B 10/25751 | 398/115 |
| 8,644,706 B2* | 2/2014 | Rakib | H04N 7/10 | 370/229 |
| 8,938,769 B2* | 1/2015 | Rakib | H04N 21/6118 | 725/119 |
| 2004/0136712 A1* | 7/2004 | Stiscia | H04J 3/1694 | 398/60 |
| 2010/0074614 A1* | 3/2010 | DeLew | H04B 10/272 | 398/17 |
| 2010/0135265 A1* | 6/2010 | Asati | H04L 12/2801 | 370/338 |
| 2010/0239251 A1* | 9/2010 | Biegert | H04J 14/0282 | 398/58 |
| 2010/0247099 A1* | 9/2010 | Lowery | H04B 10/2543 | 398/79 |
| 2011/0182583 A1* | 7/2011 | Rakib | H04L 12/2801 | 398/67 |
| 2011/0255862 A1* | 10/2011 | Riggsby | H04B 10/25751 | 398/25 |
| 2012/0257891 A1* | 10/2012 | Boyd | H04L 47/6215 | 398/45 |
| 2012/0291084 A1* | 11/2012 | Rakib | H04N 7/10 | 725/111 |
| 2013/0064507 A1* | 3/2013 | Mahnkopf | G02B 6/12007 | 385/52 |
| 2013/0114955 A1* | 5/2013 | Li | H04B 10/0795 | 398/16 |
| 2014/0101711 A1* | 4/2014 | Rakib | H04N 21/6118 | 725/129 |
| 2014/0150041 A1* | 5/2014 | Rakib | H04N 7/10 | 725/111 |
| 2014/0199081 A1* | 7/2014 | Ling | H04B 10/25 | 398/116 |
| 2015/0172072 A1* | 6/2015 | Rakib | H04N 21/6118 | 725/111 |
| 2016/0308619 A1* | 10/2016 | Ling | H04B 10/564 | |
| 2016/0373125 A1* | 12/2016 | Pagnanelli | H03M 3/404 | |

* cited by examiner

FIG. 3A
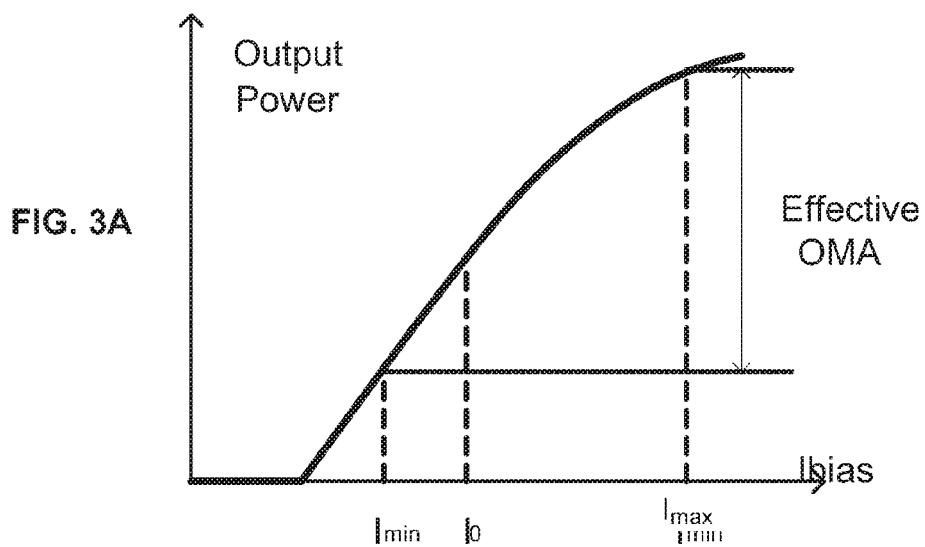
FIG. 3B
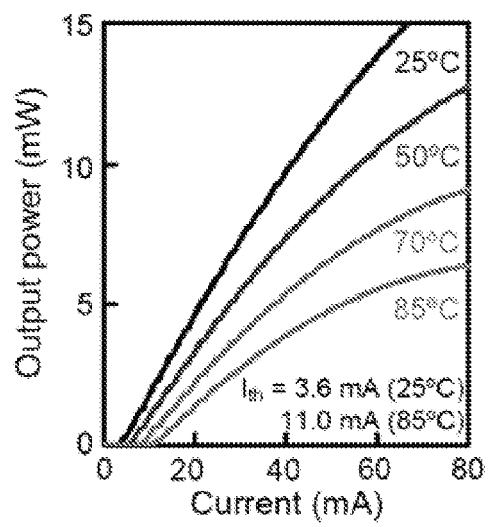
FIG. 3C
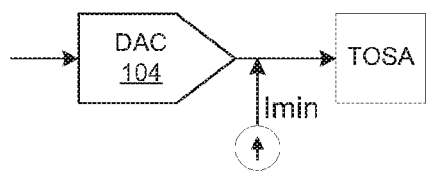
FIG. 3A-3C

US 9,794,000 B2

HIGH-SPEED, LOW-POWER OPTICAL COMMUNICATIONS

CROSS REFERENCE TO RELATED APPLICATIONS

This application claims priority to U.S. provisional patent application Ser. No. 62/149,099, filed Apr. 17, 2015. The above-referenced United States provisional patent application is hereby incorporated by reference in its entirety.

BACKGROUND

Limitations and disadvantages of conventional and traditional approaches to optical communications will become apparent to one of skill in the art, through comparison of such systems with some aspects of the present invention as set forth in the remainder of the present application with reference to the drawings.

BRIEF SUMMARY OF THE INVENTION

Systems and methods are provided for high-speed, low-power fiber optic communications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3A illustrates the nonlinear response of a typical laser diode.

FIG. 3B illustrates how the response of a typical laser diode may vary over temperature.

FIG. 3C illustrates an example circuit for driving a transmit optical subassembly.

DETAILED DESCRIPTION OF THE INVENTION

Figure 1A:
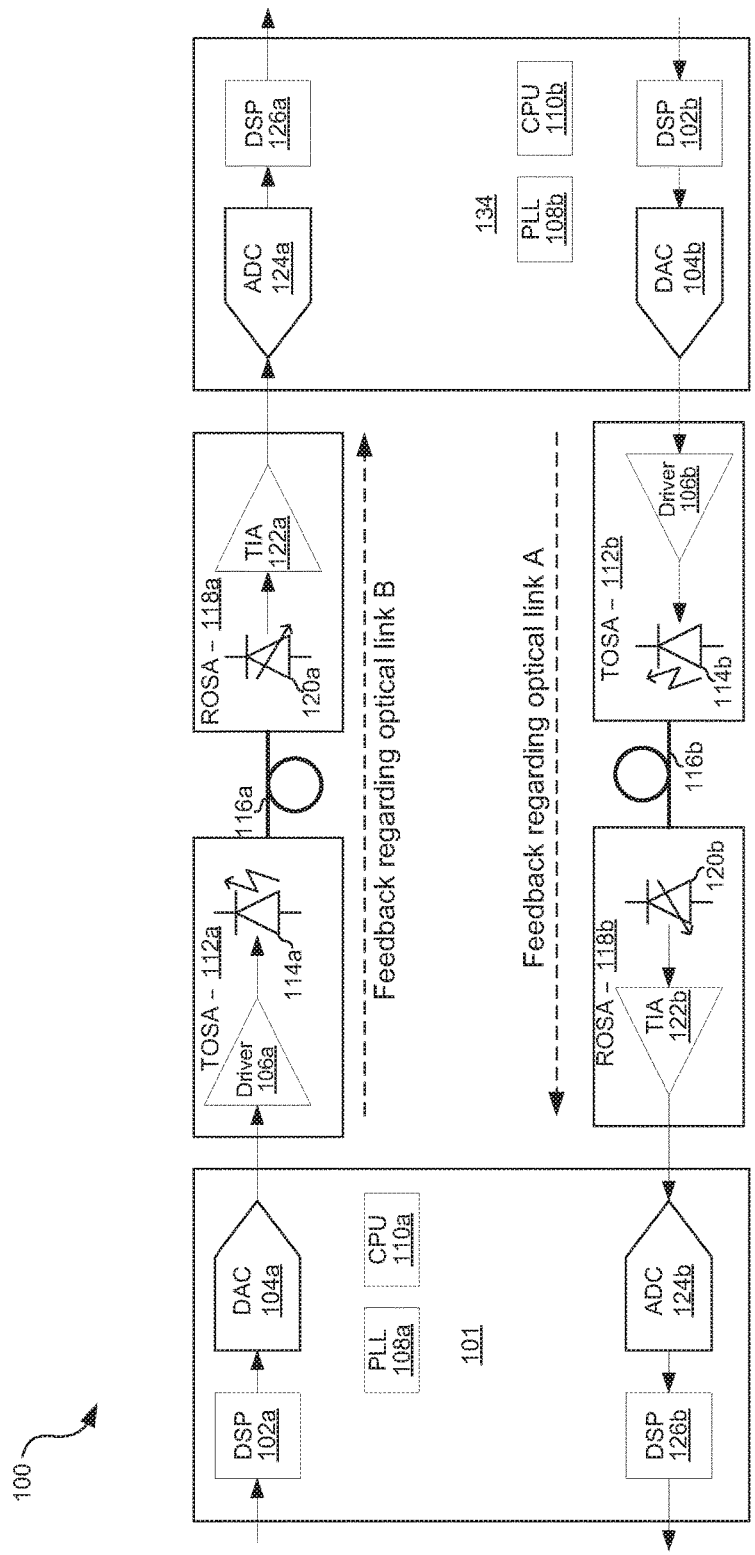
FIG. 1A shows a first example closed-loop optical communication system in accordance with aspects of this disclosure.

FIG. 1A shows a first example closed-loop optical communication system in accordance with aspects of this disclosure. The system 100 comprises transmit and receive electrical subsystems 101 and 134, transmit optical subassemblies (TOSA's) 112a and 112b, receive optical subassemblies (ROSA's) 118a and 118b, and optical fibers 116a and 116b.

Each of the subsystems 101 and 134 comprises a transmit digital signal processing circuit 102, a receive digital signal processing circuit 126, a digital-to-analog converter (DAC) 104, an analog-to-digital converter (ADC) 124, a PLL 108, and a CPU 110 (where the different instances of each component are labeled 'a' and 'b', respectively). Each TOSA 112 comprises a laser diode driver 106, and a laser diode 114. Each ROSA 112 comprises a photodiode 120, and a transimpedance amplifier 122. The TOSA 112a, optical fiber 116a, and ROSA 118a are collectively referred to as "optical link A" and TOSA 112b, optical fiber 116b, and ROSA 118b are collectively referred to as "optical link B."

Each of the CPUs 110a and 110b may be operable to manage operations of a respective one the electrical subsystems 101 and 134. As discussed in further detail below, such management may comprise, for example, each of the CPUs 110a and 110b receiving feedback via a respective one of the optical links and configuring its DSP 102, DSP 126, DAC 104, and ADC 124 based on the received feedback. Each of the CPUs 110 may also generate feedback signals based on output of its respective DSP 126.

Each PLL 108 may be operable to generate one or more timing signals such as sample clocks for the DAC 104 and ADC 124.

Each DSP 102 is operable to receive one or more streams of data and process the data to generate a signal suitable for directly modulating a respective one of the TOSA's 112. Example implementations of the DSP 102 can be seen in FIGS. 5 and 6.

Each DAC 104 is operable to convert the digital signal output by a respective one of DSPs 102 to generate an analog waveform. Example configuration and operation of the DACs 104 is described below with reference to FIGS. 3C and 4.

Each driver 106 is operable to suitably condition the output of DAC 104a for application to a respective one of laser diodes 114.

Each laser diode 114 is operable to generate a light beam having an intensity proportional to the current output by its respective driver 106. As described below, the input current to output optical power of a typical laser diode may be highly nonlinear and vary greatly over temperature. Methods and systems for dealing with such nonlinearity and temperature dependence are further discussed below.

Each photodiode 120 is operable generate an output current proportional to the intensity of light incident on it.

Each transimpedance amplifier 122 is operable to convert the current output by a respective photodiode 120 to a voltage with a suitable range for input to a respective one of the ADCs 124.

Each ADC 124 is operable to convert the analog voltage present at its input to a corresponding digital value.

Each DSP 126 is operable to perform various operations on the received signal output by its respective ADC 124. Each DSP 126 may be operable to analyze a received signal to determine various characteristics of the optical link over which it was received. Such characteristics may include, for example: a nonlinearity of the optical link (e.g., determine coefficients of a Volterra series that models the link) and a temperature of the laser diode 114 of the optical link. The nonlinearity may be determined by, for example, comparing received signals (e.g., pilots or decoded data) with expected signals. The temperature may be indirectly determined based on known behavior of the optical components over temperature and/or determined directly from a temperature measurement reported by the optical components (e.g., on a control or "out-of-band" channel). Each DSP 126 may output the determined characteristics of its respective optical link to its respective CPU for generation of a feedback signal to communicate the determined characteristics back to the other electrical subsystem.

Figure 1B:
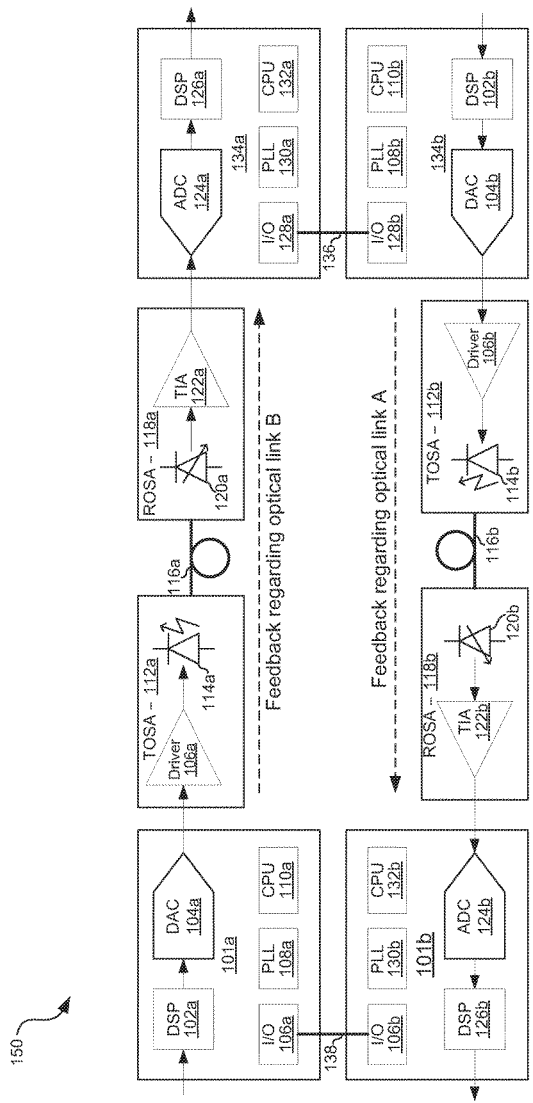
FIG. 1B shows a second example closed-loop optical communication system in accordance with aspects of this disclosure.

FIG. 1B shows a second example closed-loop optical communication system in accordance with aspects of this disclosure. The system 150 of FIG. 1B is similar to the system 100 of FIG. 1A except that electrical subsystem 101 is replaced by two discrete electrical subsystems 101a and 101b and electrical subsystem 134 is replaced by two discrete electrical subsystems 134a and 134b. In order to facilitate the feedback of the characteristics of the optical links, the electrical subsystems 101a and 101b comprise interface circuits 106a and 106b which are connected to each other via connection 138 and via which feedback about optical link A, received via optical link B, can be communicated to CPU 110a and used for configuring electrical subsystem 101a.

Similarly, the electrical subsystems 134a and 134b comprise interface circuits 128a and 128b which are connected to each other via connection 136 and via which feedback about optical link B, received via optical link A, can be communicated to CPU 110b and used for configuring electrical subsystem 134b.

Figure 2:
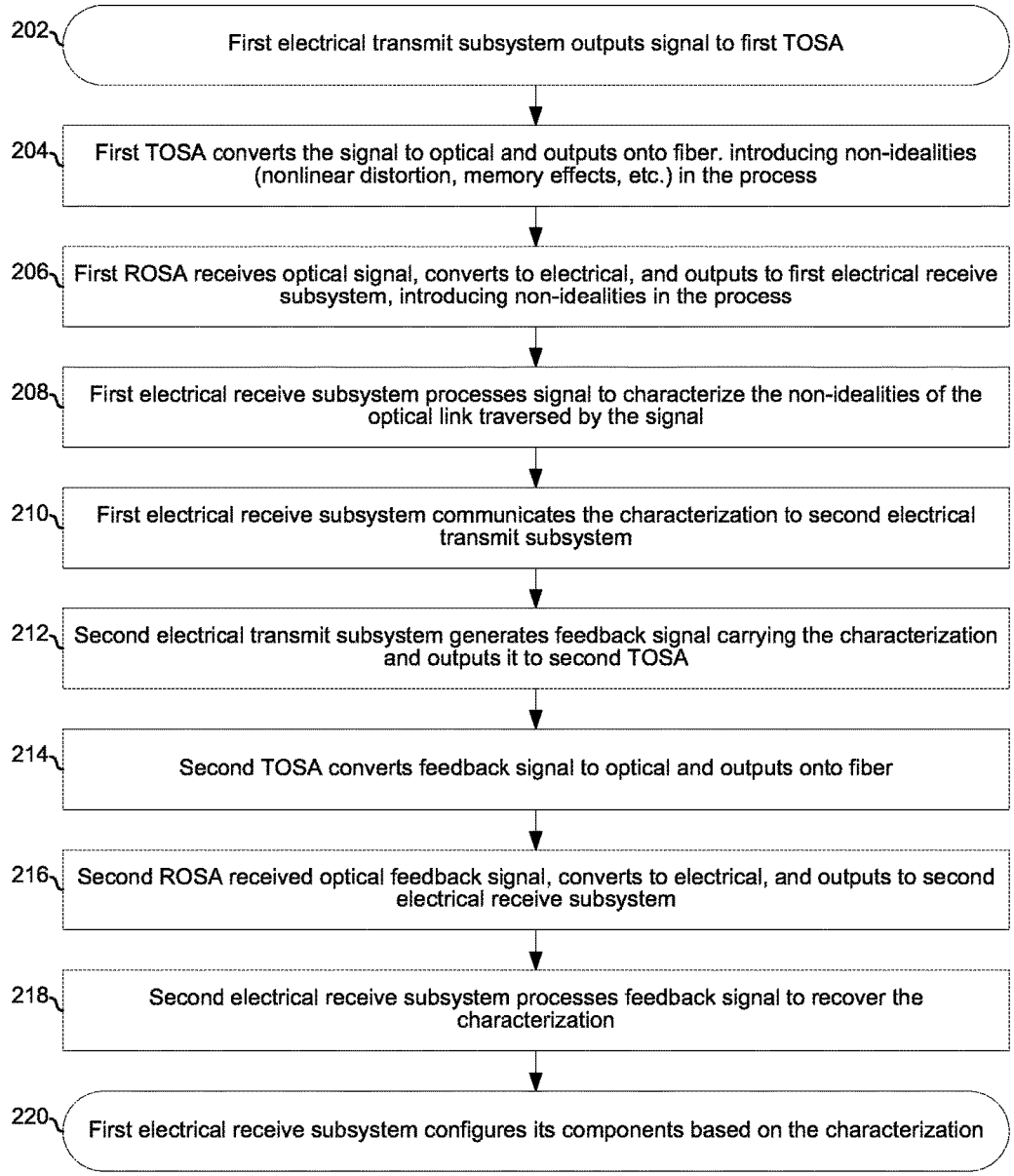
FIG. 2 is a flowchart illustrating operation of a closed-loop optical communication system in accordance with aspects of this disclosure.

FIG. 2 is a flowchart illustrating operation of a closed-loop optical communication system in accordance with aspects of this disclosure. In block 202, a first electrical transmit subsystem (e.g., 101a) outputs a signal to a first TOSA (e.g., 112a). In block 204, the first TOSA converts the electrical signal to an optical signal and outputs it onto an optical fiber. In the process of generating the optical signal, the TOSA introduces non-idealities (nonlinear distortion, memory effects, etc.).

In block 206, a first ROSA (e.g., 118a) receives the optical signal, converts it to electrical, and outputs the electrical signal to a first electrical receive subsystem (e.g., 134a). In the process of generating the electrical signal, the TOSA introduces non-idealities (nonlinear distortion, memory effects, etc.). In block 208, the first electrical receive subsystem (e.g., 134a) processes the electrical signal to characterize the non-idealities of the optical link that the signal traversed (e.g., optical link A).

In block 210, the first electrical receive subsystem communicates the characterization to a second electrical transmit subsystem (e.g., 134b). In block 212, the second electrical transmit subsystem generates feedback signal carrying the characterization and outputs it to a second TOSA (e.g., 112b). In block 214, the second TOSA converts the feedback signal to optical and outputs it onto an optical fiber. In block 216, a second ROSA (e.g., 118b) receives optical feedback signal, converts it to electrical, and outputs to second electrical receive subsystem (e.g., 110b). In block 218, the second electrical receive subsystem processes feedback signal to recover the characterization. In block 220, the first electrical receive subsystem configures its components based on the characterization. For example, the first electrical receive subsystem may configure its DAC 104 as described below with reference to FIGS. 3C and 4.

FIG. 3A illustrates the nonlinear response of a typical laser diode. In an example implementation, the diode may be operated such that the average input current is $I_0$, the minimum input current is $I_{MIN}$ and the maximum input current is $I_{MAX}$. Given the temperature dependence of the optical output power vs input power, as shown in FIG. 3B, $I_0$, $I_{MIN}$, and $I_{MAX}$ may be configured dynamically based on the temperature of the diode. $I_{MIN}$ may be selected to ensure the diode doesn't turn off under the existing conditions. $I_0$ and $I_{MAX}$ may be selected to ensure the diode does not get damaged under the existing conditions.

FIG. 3C illustrates an example circuit for driving a transmit optical subassembly. In FIG. 3O, $I_{MIN}$ is provided by a current source separate from the DAC 104. This may reduce the power consumption of the DAC and allow the DAC codes to be allocated over a smaller current range, thus providing finer resolution.

Figure 4:
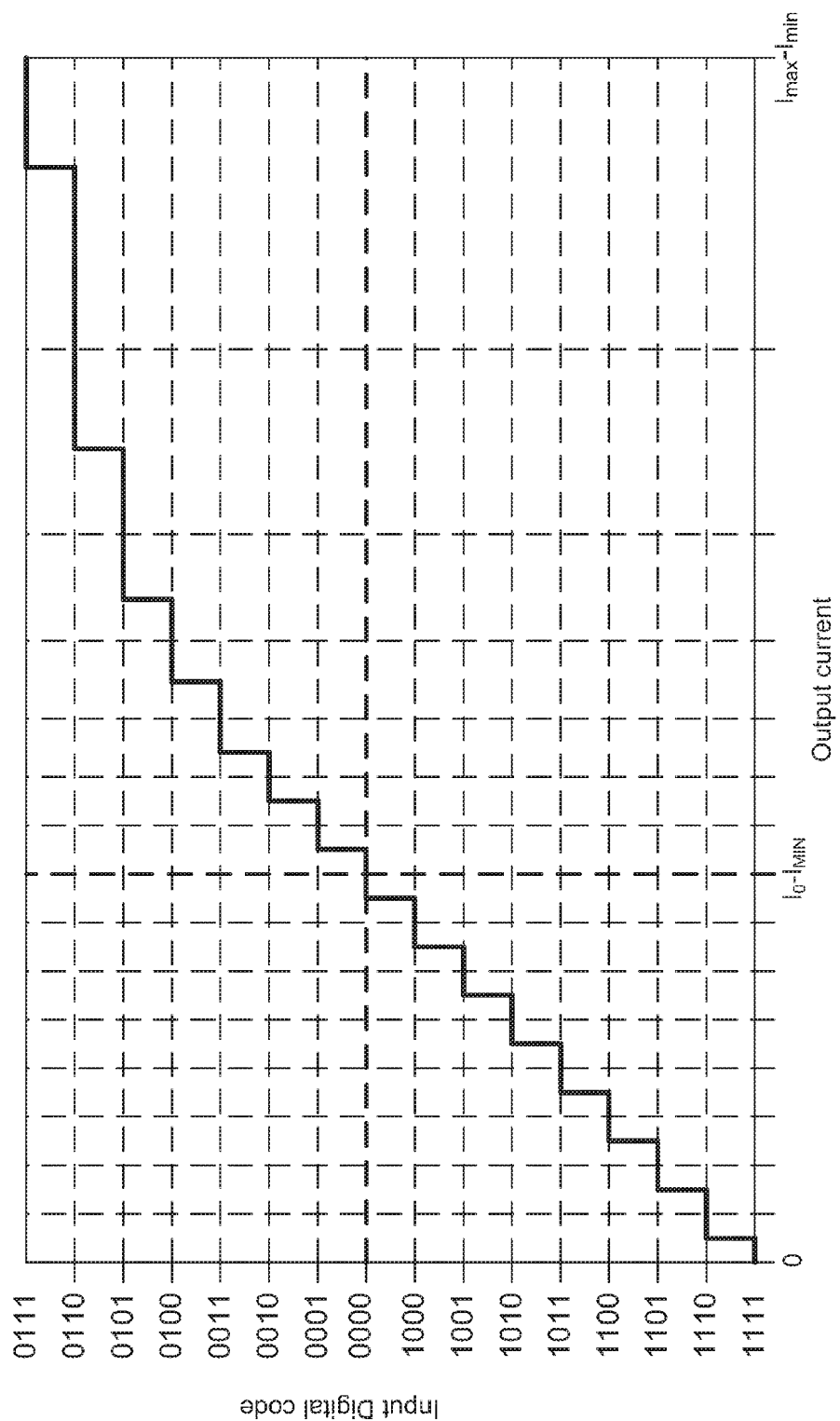
FIG. 4 illustrates configuration of a digital to analog converter (DAC) used to drive a TOSA in a closed-loop optical communication system.

FIG. 4 illustrates configuration of a digital to analog converter (DAC) used to drive a TOSA in a closed-loop optical communication system. In FIG. 4, the DAC is configured to take advantage of the nonlinear response of the laser diode. The current provided by the DAC ranges from 0 to $I_{MAX}$-$I_{MIN}$, where, as noted above, $I_{MAX}$ and $I_{MIN}$ may be dynamically configured based on the temperature of the diode. In the example shown, the DAC codes map nonlinearly to current so as provide as large of an optical maximum amplitude (DMA) as possible. That is, such a nonlinear mapping of current to DAC codes allows the system to: (1) use all the DAC, thus providing fine resolution while (2) maintaining a relatively average current $I_0$, thus reducing power consumption and still (3) swinging up to $I_{MAX}$ and down to $I_{MIN}$, thus providing large DMA (and thus SNR).

In addition to IMIN, IMAX, and I0 being dynamically controlled based on temperature. The size of the current steps between DAC codes may also be dynamically configurable based on temperature so as to match the response of the laser diode at the current temperature. For example, as shown in FIG. 3B, the response at 25 degrees is much more linear than the response at 75 degrees and the spacing of the current steps may correspondingly be much more linear when the diode is at 25 degrees than when it is operating at 75 degrees.

Figure 5:
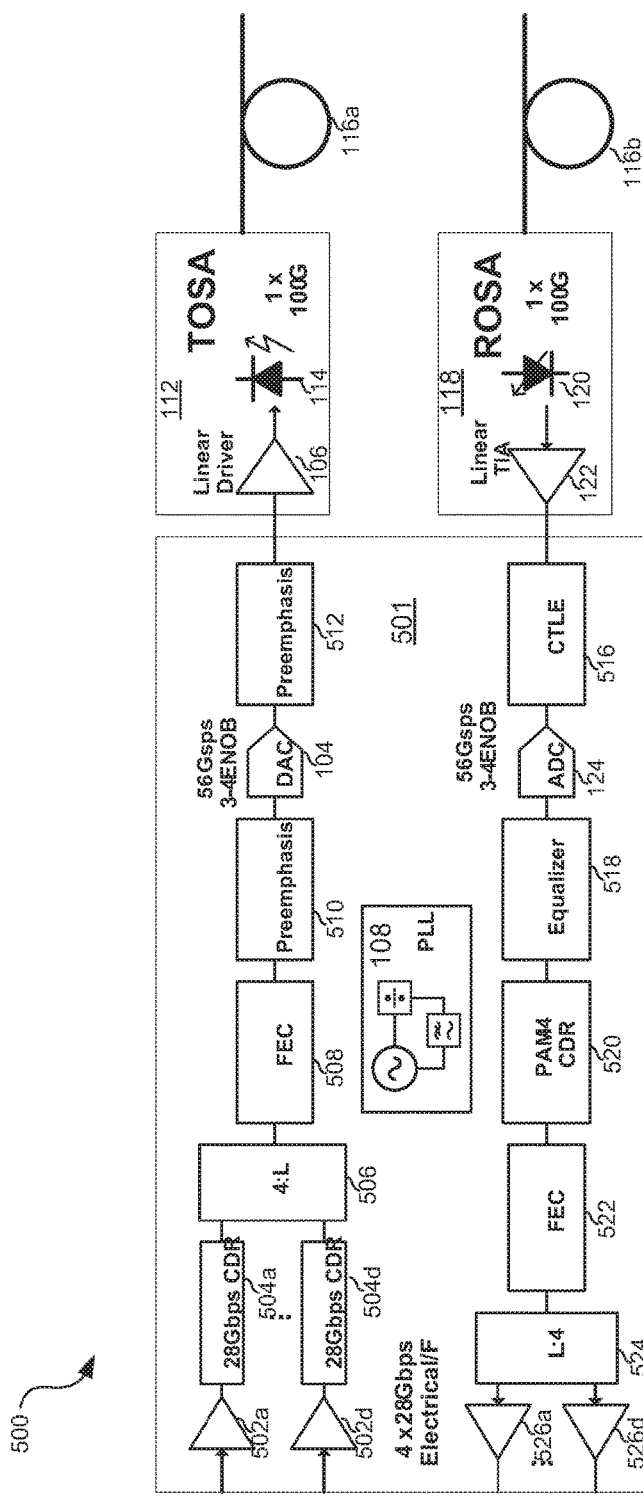
FIGS. 5 and 6 illustrate two example implementations of an electrical subsystem in accordance with aspects of this disclosure.
Figure 6:
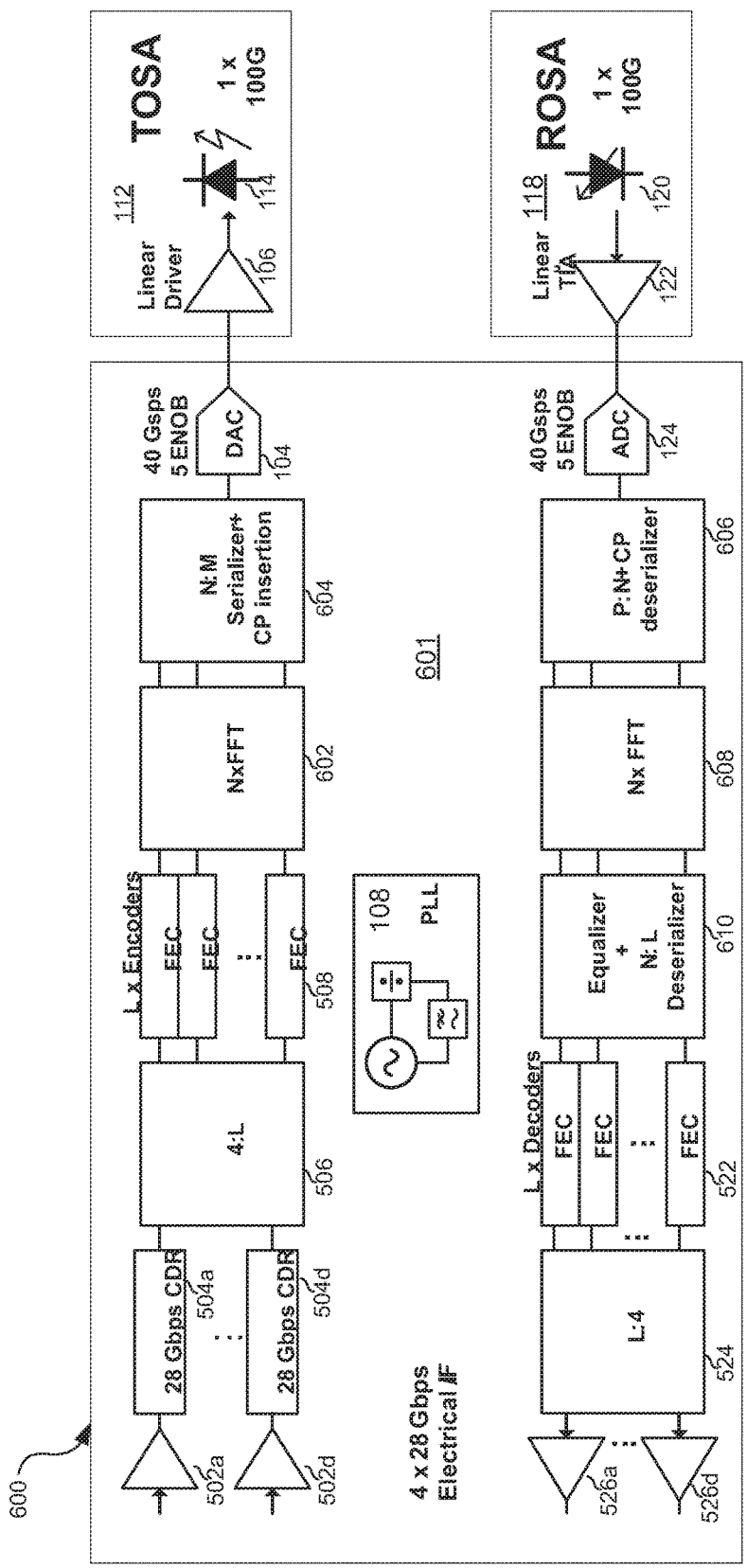

FIGS. 5 and 6 illustrate two example implementations of an electrical subsystem in accordance with aspects of this disclosure. FIG. 5 shows an optical communication system in accordance with aspects of this disclosure. The system 500 comprises transmit and receive electrical subsystem 501, transmit optical subassembly (TOSA) 112, receive optical subassembly (ROSA) 118, and optical fibers 116a and 116b. TOSA 112 comprises a laser diode driver 106, and a laser diode 114. ROSA 112 comprises a photodiode 120, and a transimpedance amplifier 122. TOSA 112 and optical fiber 116a are elements of "optical link A." ROSA 118 and optical fiber 116b elements of "optical link B."

The subsystem 501 comprises a digital-to-analog converter (DAC) 104, an analog-to-digital converter (ADC) 124, a PLL 108, digital processing circuitry, and line drivers 502a, 502d, 526a, 526d. As illustrated, a first instance and a fourth instance of a component are labeled 'a' and 'd', respectively.

Each driver 502 is operable to suitably condition one of four channels for transmit digital processing. Each clock and data recovery (CDR) circuit 504 is operable to output synchronized data to mapping circuit 506. Mapping circuit 506 is operable to map 4 channels to L forward error correction (FEC) encoders 508. The output from the L FEC encoders 508 may be processed by preemphasis circuit 510, in accordance with FIG. 4 as described above, before digital-to-analog conversion. Alternatively or additionally, preemphasis circuit 512 may process the analog output from digital-to-analog converter 104. Preemphasis circuit 512 may add a current offset and/or supplement the nonlinearity compensation of preemphasis circuit 510. The preemphasis circuits 510 and 512 may be dynamically configured via feedback from optical link B.

PLL 108 may be operable to generate one or more timing signals such as sample clocks for the DAC 104 and ADC 124. DAC 104 is operable to convert the digital signal output by preemphasis circuit 512 to generate an analog waveform. Driver 106 is operable to suitably condition the output of preemphasis circuit 512 for application to a laser diode 114. Laser diode 114 is operable to generate a light beam having an intensity proportional to the current output by driver 106.

In receiver section 118, photodiode 120 is operable generate an output current proportional to the intensity of light incident on it. Transimpedance amplifier 122 is operable to convert the current output by photodiode 120 to a voltage with a suitable range for input to a continuous-time linear equalizer (CTLE) 516. ADC 124 is operable to convert the analog voltage present at the output of CTLE 516 to a corresponding digital value. The digital output of ADC 124 is processed by digital equalizer 518 to compensate for channel memory effects. The output from the digital equalizer 518 is decoded by a PAM4 CDR circuit 520. Low-amplitude symbols (e.g., 00 and 01) may be encoded by four-level pulse-amplitude modulation (PAM4) and given strong protection, whereas high-amplitude symbols (e.g., 10 and 11) may be given weak protection. The decoded symbols are then decoded by L FEC decoders 522 to produce L streams. Mapping circuit 524 maps the L streams to 4 channels, which are driven by four driver circuits. The first driver circuit 526a and the fourth driver circuit 526d are illustrated in FIG. 5. The FEC may be such that low-amplitude symbols are more strongly protected (e.g., with relatively more redundancy) and high-amplitude signals are less strongly protected (e.g., with relatively less redundancy).

FIG. 6 shows another optical communication system in accordance with aspects of this disclosure. The system 600 comprises transmit and receive electrical subsystem 601, transmit optical subassembly (TOSA) 112, and receive optical subassembly (ROSA) 118. TOSA 112 comprises a laser diode driver 106, and a laser diode 114. ROSA 112 comprises a photodiode 120, and a transimpedance amplifier 122.

The subsystem 601 comprises a digital-to-analog converter (DAC) 104, an analog-to-digital converter (ADC) 124, a PLL 108, digital processing circuitry, and line drivers 502a, 502d, 526a, 526d. As illustrated, a first instance and a fourth instance of a component are labeled 'a' and 'd', respectively.

Each driver 502 is operable to suitably condition one of four channels for transmit digital processing. Each clock and data recovery (CDR) circuit 504 is operable to output synchronized data to mapping circuit 506. Mapping circuit 506 is operable to map 4 channels to L forward error correction (FEC) encoders 508. The output from the L FEC encoders 508 may be processed by FFT circuit 602. Code protection (CP) may be added to the N point FFT output before or during serialization by serializer circuit 604.

PLL 108 may be operable to generate one or more timing signals such as sample clocks for the DAC 104 and ADC 124. DAC 104 is operable to convert the digital signal output by serializer circuit 604 to generate an analog waveform. Driver 106 is operable to suitably condition the output of DAC 104 for application to a laser diode 114. Laser diode 114 is operable to generate a light beam having an intensity proportional to the current output by driver 106.

In receiver section 118, photodiode 120 is operable generate an output current proportional to the intensity of light incident on it. Transimpedance amplifier 122 is operable to convert the current output by photodiode 120 to a voltage with a suitable range for input to ADC 124. ADC 124 is operable to convert the analog voltage present at the output of transimpedance amplifier 122 to a corresponding digital value. The digital output of ADC 124 is deserialized by deserializer circuit 606. The output from deserializer circuit 606 is processed by FFT circuit 608. The N-point output from FFT circuit 608 is deserialized from N to L by deserializer circuit 610. Deserializer circuit 610 may also perform equalization. The FFT out is decoded by L FEC decoders 522 to produce L streams. Mapping circuit 524 maps the L streams to 4 channels, which are driven by four driver circuits. The first driver circuit 526a and the fourth driver circuit 526d are illustrated in FIG. 6. The FEC may be such that low-amplitude symbols are more strongly protected (e.g., with relatively more redundancy) and high-amplitude signals are less strongly protected (e.g., with relatively less redundancy).

In either of the implementations of FIGS. 5 and 6, the FEC encoder may perform symbol amplitude sensitive encoding to take advantage of the nonlinear DAC mapping discussed above. That is, with such a nonlinear DAC mapping, symbols corresponding to high input current to the laser diode will have larger differences between adjacent symbols, and thus easier for the receiver to distinguish than symbols corresponding to lower diode input currents. Accordingly, the FEC encoding may be such that low-amplitude symbols are more strongly protected (e.g., with relatively more redundancy) and high-amplitude signals are less strongly protected (e.g., with relatively less redundancy). For example, for PAM4, the encoding may be such that low-amplitude symbols 00 and 01 are given strong protection whereas high-amplitude symbols 10 and 11 are given weak protection.

Figure 7:
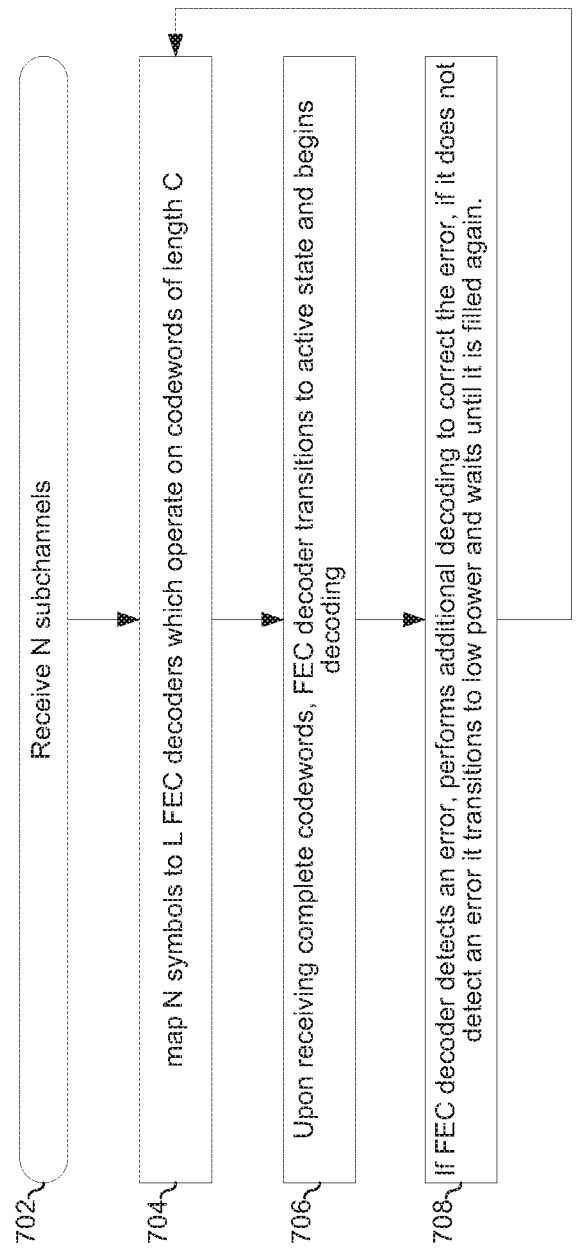
FIG. 7 is a flowchart illustrating an example error detection and correction process in accordance with aspects of this disclosure.

FIG. 7 is a flowchart illustrating an example error detection and correction process in accordance with aspects of this disclosure. This example process is described with reference to the electrical subsystem shown in FIG. 6. In block 702, N symbols (e.g., N symbols from N tones for DMT or from N subcarriers for OFDM) are output by the FFT. In block 704, the N subchannels then mapped (multiplexed or demultiplexed) to L FEC decoders, where N and L are integers which may be different or equal. Each of the FEC decoders may process codewords of length C. The decoders may be filled sequentially such that, for example, if C=N, then a decoder will received a complete codeword with each OFDM symbol. In block 706, as each FEC decoder receives a complete codeword, that FEC decoder transitions to an active state and begins decoding. In block 708, if the FEC decoder detects an error it then proceeds to perform additional decoding to correct the error. If it does not detect an error, it outputs the decoded word and then transitions to low power and waits until it is filled again. In this manner, assuming relatively infrequent errors, then relatively few of the FEC decoders will be performing error correction (which is typically computationally more intensive than error detection) at any given time, and foregoing the error correction when not needed saves significant power.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

The present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system for optical communications, comprising:
   a digital-to-analog converter (DAC) operable to receive a digital code of a plurality of digital codes and output an analog current signal having an analog current level of a plurality of analog current levels, wherein a mapping between the plurality of digital codes and the plurality of analog current levels is dynamically controlled;
   a driver operable to condition the analog current signal output from the digital-to-analog converter; and
   a transmit optical subsystem operable to generate an optical power signal from the conditioned analog current signal,
   the mapping being dynamically controlled according to one or more characteristics of the optical power signal.

2. The system of claim 1, wherein the one or more characteristics of the optical power signal comprise a nonlinear relationship between the analog current signal and the optical power signal, the nonlinear relationship being temperature dependent.

3. The system of claim 2, wherein the nonlinear relationship is determined according to a temperature and a predetermined behavior of the transmit optical subsystem.

4. The system of claim 1, wherein the one or more characteristics of the optical power signal comprise a temperature that is determined according to a plurality of Volterra series coefficients and a comparison between the optical power signal and an expected signal.

5. The system of claim 1, wherein the driver comprises a current source operable to increase the level of the analog current signal based on a temperature.

6. The system of claim 1, wherein the mapping between the plurality of digital codes and the plurality of analog current levels is based on a temperature.

7. The system of claim 1, wherein the one or more characteristics of the optical power signal comprise a detection of errors, a symbol amplitude sensitive encoding being applied according to the detection of errors, wherein the symbol amplitude sensitive encoding is applied to a series of digital codes of the plurality of digital codes that are mapped to lower analog current levels of the plurality of analog current levels.

8. A method for optical communications, wherein the method comprises:
   receiving a digital code of a plurality of digital codes;
   converting the digital code to an analog current signal having an analog current level of a plurality of analog current levels;
   conditioning the analog current signal;
   generating an optical power signal from the conditioned analog current signal;
   transmitting the optical power signal from a transmit optical subsystem; and
   updating a mapping between the plurality of digital codes and the plurality of analog current levels according to the optical power signal.

9. The method of claim 8, wherein the method comprises determining whether the relationship between the conditioned analog current signal and the optical power signal is nonlinear.

10. The method of claim 9, wherein the method comprises determining a temperature according to a predetermined behavior of the transmit optical subsystem, if the relationship between the conditioned analog current signal and the optical power signal is determined to be nonlinear.

11. The method of claim 10, wherein the method comprises conditioning the analog current signal by increasing the level of the analog current signal according to the temperature.

12. The method of claim 9, wherein the method comprises determining whether the nonlinearity is temperature dependent according to a predetermined behavior of the transmit optical subsystem.

13. The method of claim 12 wherein the method comprises updating the mapping between the plurality of digital codes and the plurality of analog current levels based on a temperature.

14. The method of claim 8, wherein the method comprises determining whether the relationship between the conditioned analog current signal and the optical power signal is symbol amplitude sensitive.

15. The method of claim 14, wherein the method comprises encoding digital codes that are mapped to lower analog current levels, if it is determined that the relationship between the conditioned analog current signal and the optical power signal is symbol amplitude sensitive.

16. A machine-readable storage having stored thereon, a computer program having at least one code section for enabling optical communications, the at least one code section being executable by a machine for causing the machine to perform operations comprising:

sending a digital code of a plurality of digital codes to a digital-to-analog converter (DAC), wherein the DAC converts the digital code to an analog current signal having an analog current level of a plurality of analog current levels, an optical signal being generated by a transmit optical subsystem based on the analog current signal; and updating a mapping between the plurality of digital codes and the plurality of analog current levels according to the optical signal.

17. The machine-readable storage of claim 16, wherein the at least one code section is executable to perform the operation of determining whether the relationship between the analog current signal and the optical signal is nonlinear.

18. The machine-readable storage of claim 17, wherein the at least one code section is executable to perform the operation of estimating a temperature according to a channel estimation and a predetermined behavior of the transmit optical subsystem, if the relationship between the conditioned analog current signal and the optical signal is determined to be nonlinear.

19. The machine-readable storage of claim 16, wherein the at least one code section is executable to update the mapping based on a temperature.

20. The machine-readable storage of claim 16, wherein the at least one code section is executable to encode digital codes that are mapped to lower analog current levels, if it is determined that the relationship between the conditioned analog current signal and the optical signal is symbol amplitude sensitive.

* * * * *